March 14, 1961 A. J. WHITE 2,974,934
SAFETY APPARATUS FOR HIGHWAYS
Filed Nov. 2, 1959 2 Sheets-Sheet 1

INVENTOR.
Andrew J. White
BY Harold E. Cole
Attorney

March 14, 1961     A. J. WHITE     2,974,934
SAFETY APPARATUS FOR HIGHWAYS
Filed Nov. 2, 1959     2 Sheets-Sheet 2
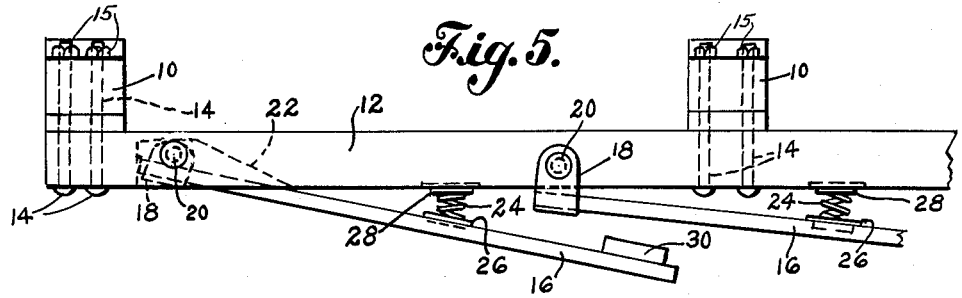
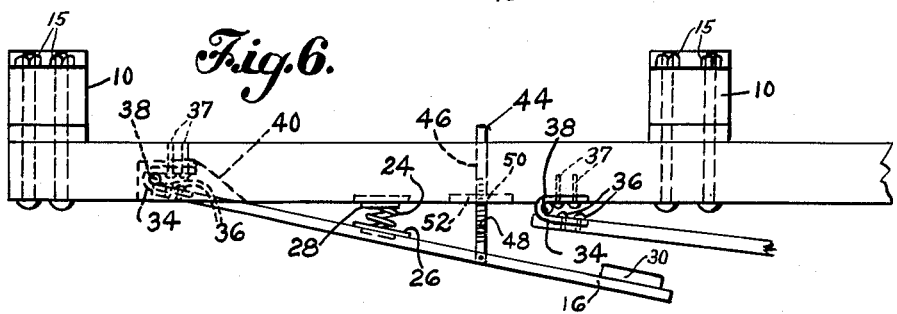
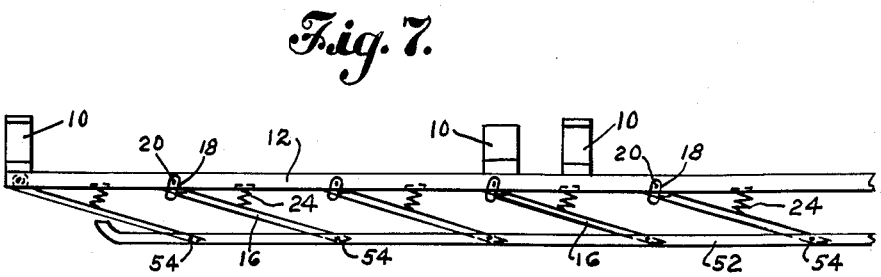
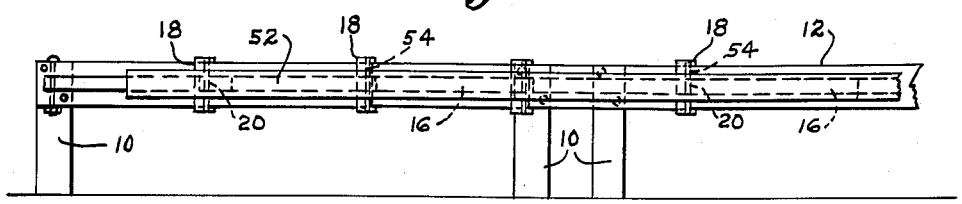
INVENTOR.
Andrew J. White
BY Harold E. Cole
Attorney United States Patent Office 2,974,934
Patented Mar. 14, 1961

2,974,934

SAFETY APPARATUS FOR HIGHWAYS

Andrew J. White, Lee, N.H.
(Newmarket P.O., South Lee, N.H.)

Filed Nov. 2, 1959, Ser. No. 850,255

11 Claims. (Cl. 256—13.1)

This invention relates to safety apparatus for erection at the sides of traveled ways such as automobile highways, especially at curves.

One object of my invention is to provide such apparatus so constructed that it will keep a vehicle in motion while gradually slowing it down, thus giving the vehicle travel-distance so it can decelerate gradually.

Another object is to provide such apparatus with a plurality of yielding guard rails so arranged that each can absorb some of the energy resulting from the impact of a moving automobile therewith, but avoiding head-on impact.

A further object is to provide such apparatus that is simple to install, is always ready to function, and can easily be repaired and parts replaced.

The foregoing and other objects which will appear as the nature of the invention is better understood, may be accomplished by a construction and arrangement such as is disclosed by the drawings. The nature of the invention is such as to render it susceptible to various changes and modifications, and, therefore, I am not to be limited to the construction disclosed by the drawings, nor to the particular parts described in the specification; but am entitled to all such changes therefrom as fall within the scope of my claims.

In the drawings:

Fig. 5 is an enlarged, fragmentary, top plan view of my apparatus.

Fig. 6 is a view similar to Fig. 5; but showing a modified form of my apparatus.

Fig. 7 is a top plan view of another modified form of my apparatus.

Fig. 8 is a front elevational view of the apparatus shown in Fig. 7.

Figure 1:
Fig. 1 is a side elevational view of my apparatus.

As illustrated, my safety apparatus for highways has main supporting means shown as upright posts 10 which are set into the ground and a backing member 12 which extends horizontally and is attached to said post by bolts 14 with nuts 15. For use along a highway traveled by automobiles it is desirable to have said backing member from 28 to 36 inches high and it may be of hard wood or metal such as steel, and should be non-yielding.

Guard rails 16 shown as cantilever arms, which may be made of metal, are movably fastened to said backing member 12 by attaching means such as a U-shaped hinge bracket 18, as shown in Figs. 1–5 inclusive, that is pivotally held by a rivet 20 extending through said bracket and backing member. A recess 22 is provided in said backing member 12 near one end thereof to receive said bracket 18 so it will not project. One end portion of said guard rail 16 extends into said hinge bracket where it is attached, as by welding.

Intermediate the ends of said guard rails 16 each has yielding means shown as a coil spring 24 which is attached at one end, as by welding, to a plate 26 fixed to said guard rail 16 and at the other end to a plate 28 fixed to said backing member 12. At the ends of said guard rails I preferably attach, in some instances, an energy absorbing pad 30, such as foam plastic or other material having a slow memory. A container filled with sand will serve the purpose.

Figure 2:
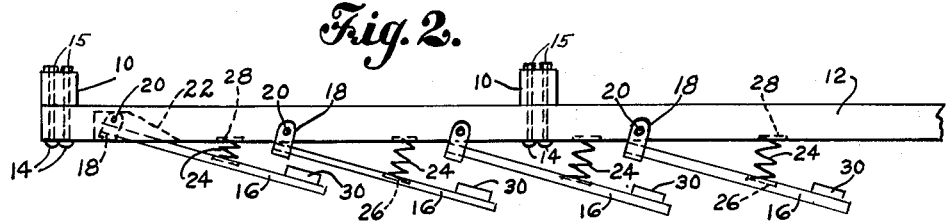
Fig. 2 is a top plan view thereof, with the guard rails in normal position.
Figure 3:
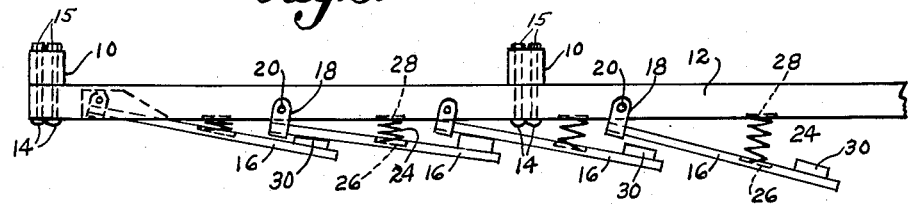
Fig. 3 is a view similar to Fig. 2; but showing some of the guard rails in position they assume from impact of a vehicle.

Said guard rails 16 normally extend diagonally outward from their attaching points on said backing member 12 to form an acute angle with the latter, as shown in Fig. 2, with one guard rail overlapping the other a substantial distance. When one is struck, as by an automobile out of control, it is forced inwardly towards said backing member and into contact with the next adjoining or second, guard rail, compressing the coil spring 24 to thus absorb some of the shock of impact. Said second guard rail is likewise forced inwardly, compressing its spring, and into contact with the next adjoining, or third, said guard rail to further absorb the shock, and this inward movement of the guard rails continues until the automobile stops or no longer contacts them. Thus the force of the impact of the automobile with the guard rails is dissipated over a plurality of them and their compressed springs, each one absorbing only a part of the shock and they also guide the moving automobile so they tend to follow the guard rails. This guiding movement enables vehicle to keep traveling thus giving it distance, to make the deceleration gradual.

I may substitute for the coil spring other resilient means, such a hydraulic ram having a piston and cylinder attached to said rail 16 and backing member 12.

In Fig. 6 of the drawings I show a modified form of my apparatus in which said guard rail 16 has a hook-shaped attaching member 34 one end portion of which is riveted as at 36 to one end portion of the guard rail, while the other end portion of this attaching member 34 is pinned or riveted, as at 37, to said backing member 12. This member 34 may be made of strong spring metal to permit some flexing and a rod 38 is inserted at the closed end of said hook-shape to control and make more gradual the flexing movement when said guard rail 16 is struck by a vehicle. A recess 40 is provided in said backing member 12 to receive the first said hook-shaped member 34 to avoid having any projecting part that a vehicle might strike.

To prevent a sudden return movement of a said guard rail 16 I may attach a well known rack 44 to the latter at a point outwardly beyond said spring 24 which movably extends through a hole 46 in said backing member 12 and the teeth 48 of which mesh, in a return movement thereof, with the teeth 50 of a dog 52 attached to said backing member. When said guard rail 16 is forced inwardly, said rack likewise so moves but when a return movement commences the teeth 52 of said dog 50 engage a tooth of said rack and thus retard, or prevent, return movement of the guard rails.

In Fig. 7 of the drawings I show guard rails 16 joined at their outside ends by a connector 52 that is attached by pins 54 to each guard rail, thus providing a continuous facing for the latter.

Figure 4:
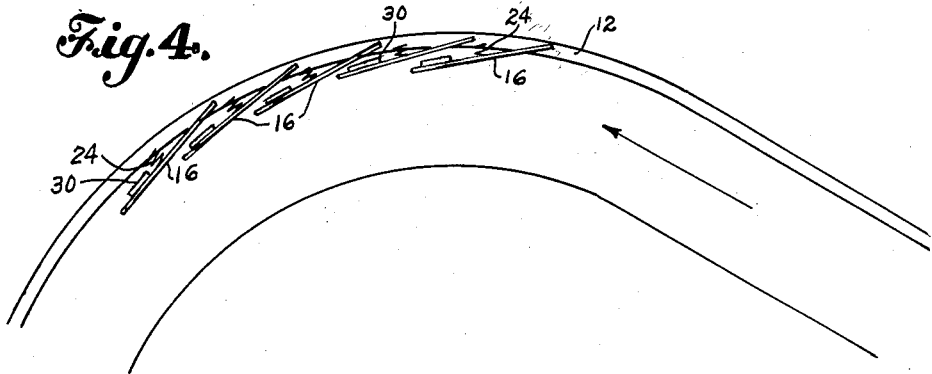
Fig. 4 is a schematic top plan view showing an installation of my apparatus at a curve in a highway.

Since automobiles are more likely to get out of control around curves, I illustrate an installation of my safety apparatus on a curve, as shown in Fig. 4.

What I claim is:

1. Safety apparatus for highways comprising supporting means, a plurality of guard rails movably attached to, and extending diagonally from, said supporting means in overlapping relationship, resilient means between and in association with said supporting means and said guard rails and adapted to yield and permit said guard rails to move inwardly towards said supporting means when force is applied thereto, said guard rails normally being spaced laterally from each other.

2. Safety apparatus for highways comprising supporting means, a plurality of guard rails movably attached to, and extending diagonally from, said supporting means in overlapping relationship, coil springs between and in association with said supporting means and said guard rails and adapted to yield and permit said guard rails to move inwardly towards said supporting means when force is applied thereto, said guard rails normally being spaced laterally from each other.

3. Safety apparatus for highways comprising supporting means embodying a backing member in fixed position, a plurality of guard rails movably attached to said backing member in overlapping relationship, a coil spring attached to each said guard rail intermediate its ends and opposite said backing member and adapted to be compressed against said backing member when said guard rail is forcibly moved inwardly, said guard rails normally being spaced laterally from each other.

4. Safety apparatus for highways comprising supporting means, embodying a backing member in fixed position, a plurality of guard rails movably attached to said backing member in overlapping relationship, a coil spring attached to each said guard rail intermediate its ends and opposite to said backing member and adapted to be compressed against said backing member when said guard rail is forcibly moved inwardly, and a connector attached to said guard rails at their outside ends and extending between them, said guard rails normally being spaced laterally from each other.

5. Safety apparatus for highways comprising supporting means embodying a backing member, a plurality of guard rails, a hinge member for and attached to each said guard rail, means movably attaching each said hinge member to said backing member, said guard rails extending diagonally from said backing member and being in overlapping relationship, and resilient means between and in association with said backing member and guard rails, said guard rails normally being spaced laterally from each other.

6. Safety apparatus for highways comprising supporting means, a plurality of guard rails movably attached to said supporting means in overlapping relationship, resilient means between and in association with said supporting means and said guard rails and adapted to yield and permit said guard rails to move inwardly towards said supporting means when force is applied thereto, and an energy absorbing pad attached to each said guard rail outwardly of said resilient means, said guard rails normally being spaced laterally from each other.

7. Safety apparatus for highways comprising supporting means embodying a backing member, a plurality of guard rails movably attached to, and extending diagonally from said backing member, in overlapping relationship and normally extending at an acute angle to said backing member, resilient means between and in association with said backing member and said guard rails and adapted to yield and permit said guard rails to move inwardly towards said supporting means when force is applied thereto, said guard rails normally being spaced laterally from each other.

8. Safety apparatus for highways comprising supporting means embodying a backing member, a plurality of guard rails, a hinge member for and attached to each said guard rail, means movably attaching each said hinge member to said backing member, said guard rails being in overlapping relationship, resilient means between and in association with said backing member and guard rails, a rack embodying teeth attached to each said guard rail and movably extending through said backing member, and a dog attached to said backing member embodying teeth adapted to mesh with said rack teeth in one direction of said movement, said guard rails normally being spaced laterally from each other.

9. Safety apparatus for highways comprising supporting means embodying a backing member, a plurality of guard rails, a spring attachment member attached to each said guard rail, means attaching each said attachment member to said backing member, said guard rails being in overlapping relationship, and resilient means between and in association with said backing member and guard rails, said guard rails normally being spaced laterally from each other.

10. Safety apparatus for highways comprising supporting means embodying a backing member, a plurality of guard rails in overlapping relationship, and extending diagonally from, and forming an acute angle with, said backing member, means movably connecting said guard rails to said backing member, and a coil spring attached to each said guard rail intermediate the ends thereof and directly opposite said backing member, a portion of each said guard rail that is outwardly beyond said coil spring being less than half the length of said guard rail, said portion only overlapping the next adjoining guard rail, said guard rails normally being spaced laterally from each other.

11. Safety apparatus for highways comprising supporting means embodying a backing member extending horizontally, a plurality of guard rails in overlapping relationships, and extending diagonally from, and forming an acute angle with, said backing member, means movably connecting said guard rails to said backing member, and a coil spring attached to each said guard rail intermediate the ends thereof and to said backing member, a portion of each said guard rail that is outwardly beyond said coil spring being less than half the length of said guard rail, said portion only overlapping the next adjoining guard rail, said guard rails normally being spaced laterally from each other.

References Cited in the file of this patent

UNITED STATES PATENTS

| | | |
|---|---|---|
| 1,847,025 | Stockard | Feb. 23, 1932 |
| 2,007,185 | Edgecombe | July 9, 1935 |
| 2,024,997 | Gleason et al. | Dec. 17, 1935 |
| 2,160,519 | Robertson | May 30, 1939 |
| 2,164,084 | Robertson | June 27, 1939 |